May 16, 1944. W. J. MOERLIN 2,348,992
HOT MILLER FOR DETACHABLE ROCK DRILL BITS
Filed Oct. 29, 1940 7 Sheets-Sheet 1

Fig. 1.

INVENTOR.
WILLIAM J. MOERLIN
BY Rollandet, McGrew & Campbell
ATTORNEYS.

May 16, 1944.  W. J. MOERLIN  2,348,992
HOT MILLER FOR DETACHABLE ROCK DRILL BITS
Filed Oct. 29, 1940   7 Sheets-Sheet 3

Patented May 16, 1944

2,348,992

UNITED STATES PATENT OFFICE 2,348,992

HOT MILLER FOR DETACHABLE ROCK DRILL BITS

William J. Moerlin, Denver, Colo., assignor to The Mine and Smelter Supply Company, Denver, Colo., a corporation of Colorado Application October 29, 1940, Serial No. 363,271

9 Claims. (Cl. 90—21)

This invention relates to improved machines for reconditioning detachable rock drill bits or the like.

As is well known to those skilled in the art, rock drill bits of the detachable type are now in extensive use. A rock drill bit of this kind ordinarily comprises a socketed shank whereby it is removably attached to a drill rod, and a plurality of radial chisel-like cutting edges. These cutting edges become dull with use, and a good way to sharpen them is to heat the detachable bit and then remove metal from between the cutting edges as by a rotary V-faced milling cutter.

Since the gauge or diameter of the drilled hole which is cut in the rock by such a bit, is of importance, it is necessary after each sharpening of the bit to gauge it, i. e., to present it to a milling cutter or the like while rotating the bit, in order to gauge the bit to a predetermined diameter, and to true the bit with the axis of its shank.

The aforesaid steps in sharpening and reconditioning a detachable rock drill bit are now well understood by those skilled in the art and the present invention relates to an improved machine that has certain automatic features whereby the human effort involved is reduced, and the quality of the reconditioning job is definitely controlled and improved.

The rod to which such a detachable bit is ordinarily affixed, is usually hollow, and the detachable bit itself is usually provided with a water-hole intermediate the aforesaid cutting edges. As the drill is used, water is supplied through the rod to the bit to facilitate the drilling operations, as is well understood by those skilled in the art.

During the aforesaid sharpening operation, the water-hole in the bit tends to become covered with fins of metal which are dragged thereover by the sharpening miller. Therefore, it is of importance to provide in a machine for reconditioning such bits, means for efficiently reaming out the water-hole in the bit.

Some types of machines that have been used for the present purpose require an undesirable degree of human effort to operate them.

Therefore, a principal object of the present invention is to provide a machine that has certain automatic features whereby the effort involved in reconditioning rock drill bits is reduced and the quality of the work is improved. This is not the kind of a "labor-saving" machine that will reduce employment or replace human labor. It is intended merely to standardize and improve results and make an easier and more pleasant job out of a very difficult and tiring one.

Other objects and advantages reside in details of design and construction which will be more fully disclosed in the following description and in the drawings wherein like parts have been similarly designated and in which.

In order to disclose an operative reduction to practice of the present inventive concept, the accompanying drawings, which are made a part hereof, will be described in some particularity. However, this disclosure is merely a typical example and should not be construed to express or to imply any limitation to the invention, the scope of which is, in reality, measured by the appended claims.

Figure 1:
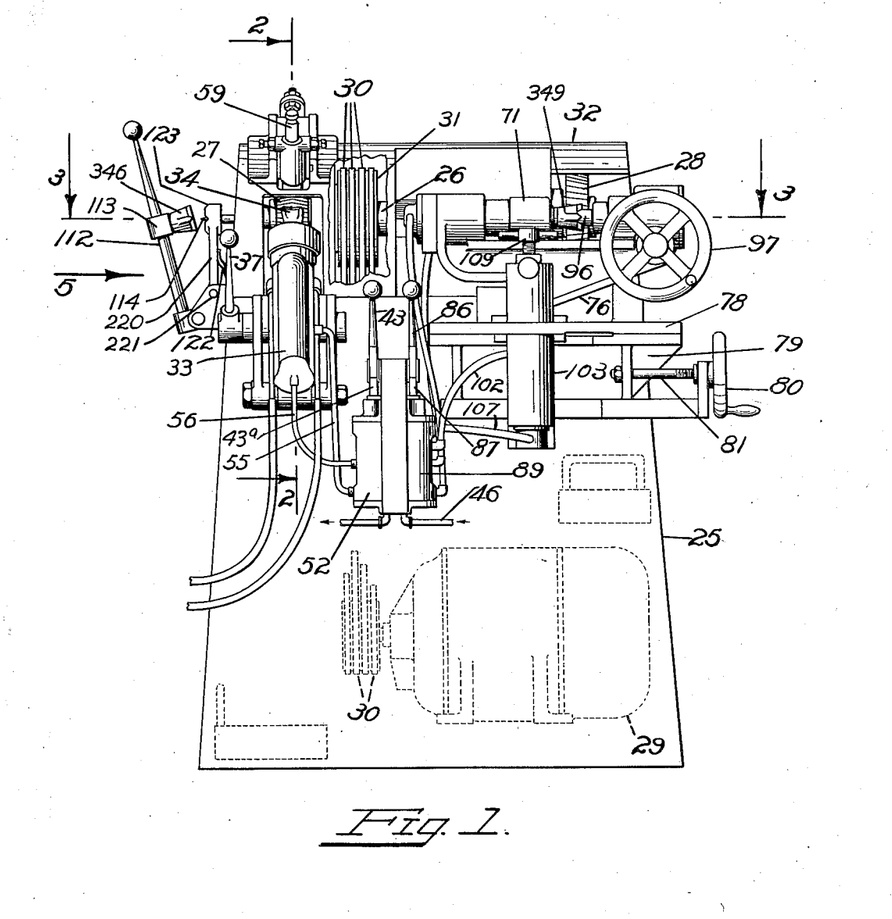
Figure 1 is a front elevation of a machine built according to the present invention.

Referring first to Figure 1, reference character 25 denotes a hollow base structure upon which is journalled a shaft 26 which carries a V-faced milling cutter 27 and an angle-faced gauging cutter 28.

The shaft 26 is driven by a motor 29 that may be conveniently housed within the hollow base 25. A plurality of V-belts 30 transmit power from the motor 29 to a multiple groove pulley 31 which is keyed or otherwise affixed to said shaft 26.

The shaft 26, together with the milling cutters 27 and 28, are conveniently housed in a removable hood 32, and provision is made whereby chips removed by milling cutters 27 and 28 from the workpiece presented thereto, are thrown downwardly into the interior of the hollow base 25, from where they can be removed as desired.

Furthermore, a blower, not shown, may be provided for drawing fumes downwardly and inwardly from the milling cutters to the interior of the base 25, whence such fumes may be exhausted into the atmosphere at any desired location, preferably remote from the machine.

A pneumatically-operated mechanism denoted as a whole by reference character 33, is pivotally mounted upon the base structure 25 and is for the purpose of presenting the rock drill bit indicated by reference character 34, to the V-faced sharpening miller 27.

Figures 2, 23, 24, 25:
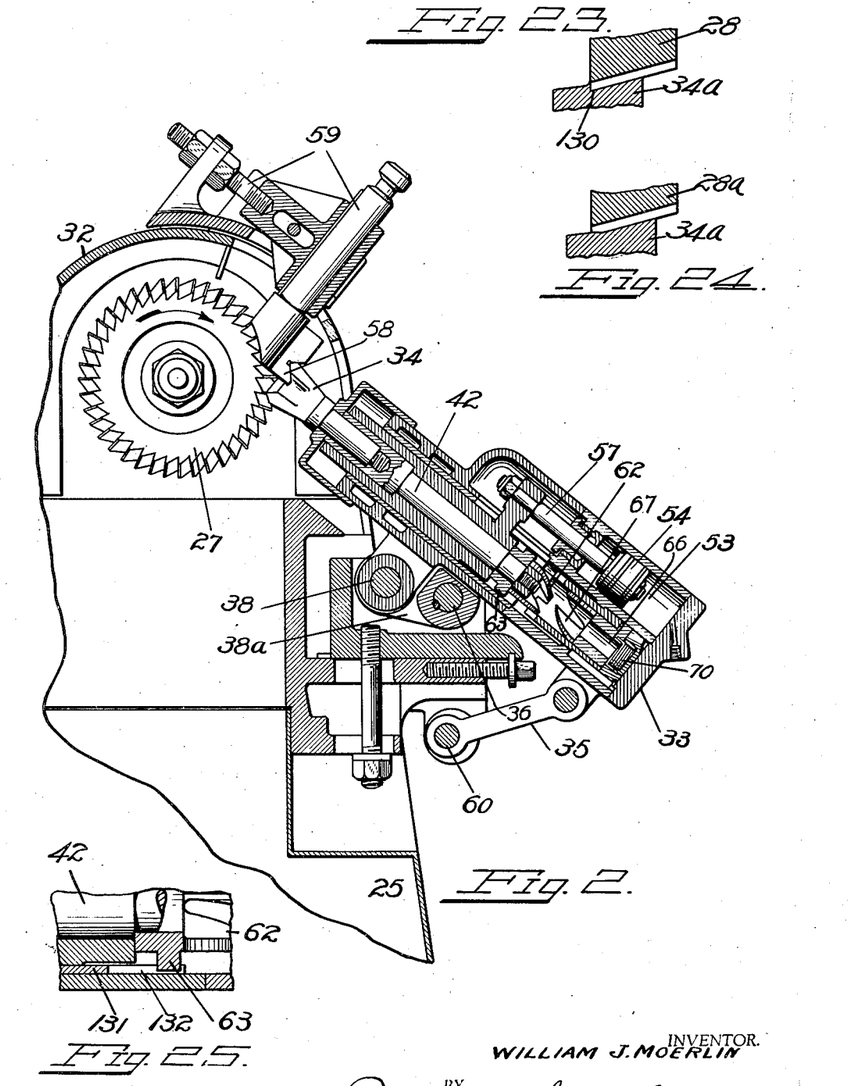
Figure 2 is a fragmentary sectional view taken along the line 2—2 of Figure 1, and drawn to a larger scale.
Figure 23 is a fragmentary sectional view showing the relationship of the gauging cutter to the bit being gauged.
Figure 24 is a fragmentary sectional view similar to Figure 23, illustrating the relationship of a modified type of gauging cutter to the bit being gauged.
Figure 25 is a fragmentary sectional view illustrating a modification of certain components shown in Figure 2, and drawn to a larger scale.
Figure 5:
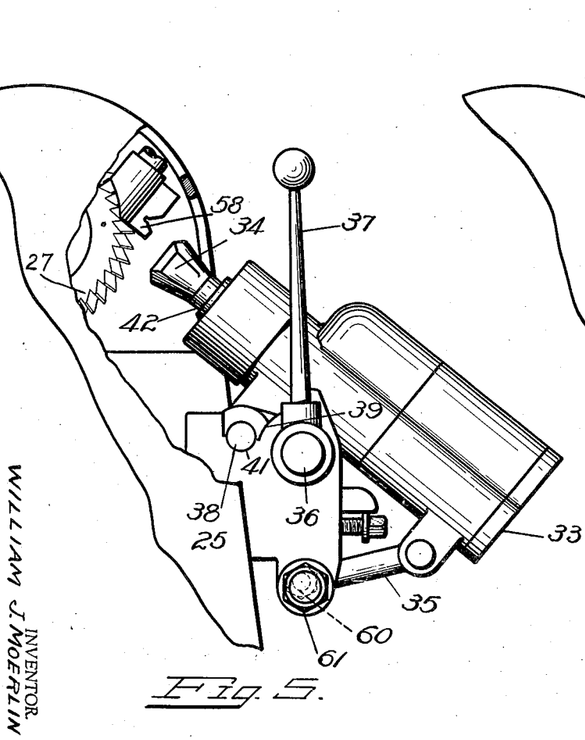
Figure 5 is a fragmentary end elevation of the machine shown in Figure 1, looking in the direction of arrow 5, and drawn to a larger scale, and partially broken away.
Figure 6:
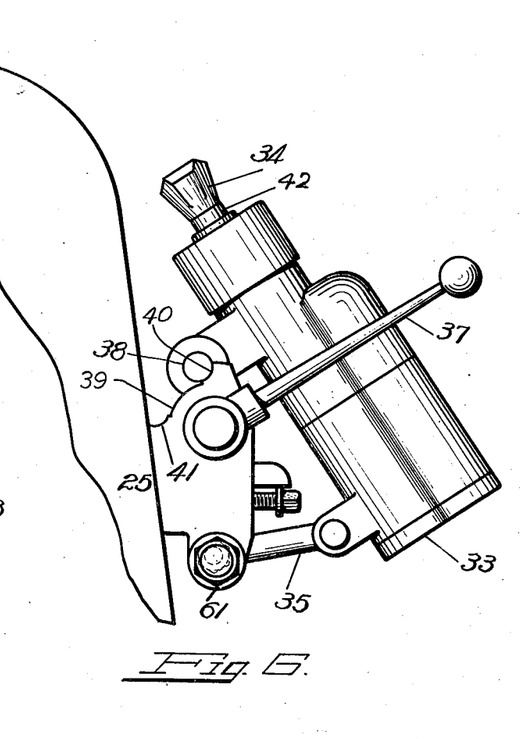
Figure 6 is a fragmentary view corresponding to Figure 5 and illustrating certain components thereof in a different operating position.
Figure 7:
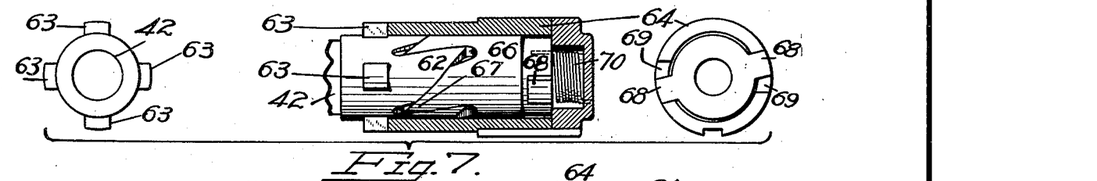
Figures 7, 8, 9, 10, 11 and 12 are diagrammatic illustrations, partially in section, showing various operating positions of certain details shown in Figure 2, and drawn to a larger scale.
Figure 8:
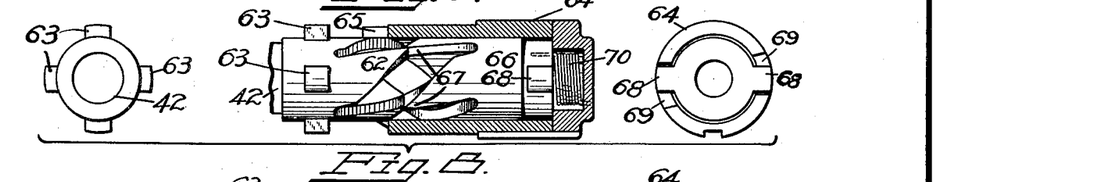
Figure 9:
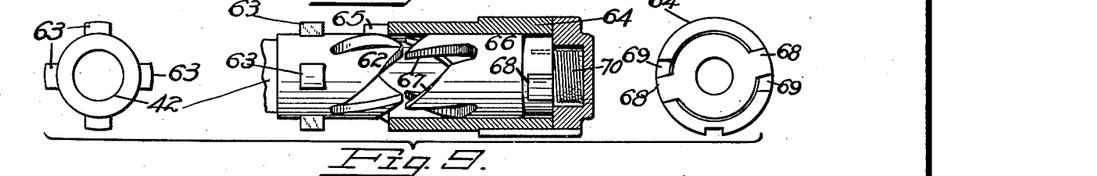

The particular details of mechanism 33 are well illustrated in Figures 2, 5 and 6.

Mechanism 33 is provided with a toggle-like mounting comprising link 35 and shaft 36, upon which is securely mounted a control lever handle 37, and stub-shaft 38 which is positioned to travel along arcuate guide 39, and the limits of whose movement are predetermined by stops 40 and 41, Figures 5 and 6. Mechanism 33 is pivotally carried upon stub-shaft 38 the position of which is controllable by lever handle 37 through the intermediary of link 38a which is securely keyed to shaft 36 and rotatably connected with said stub-shaft 38.

Figures 13, 14, 15, 16, 17, 18, 19, 20, 21:
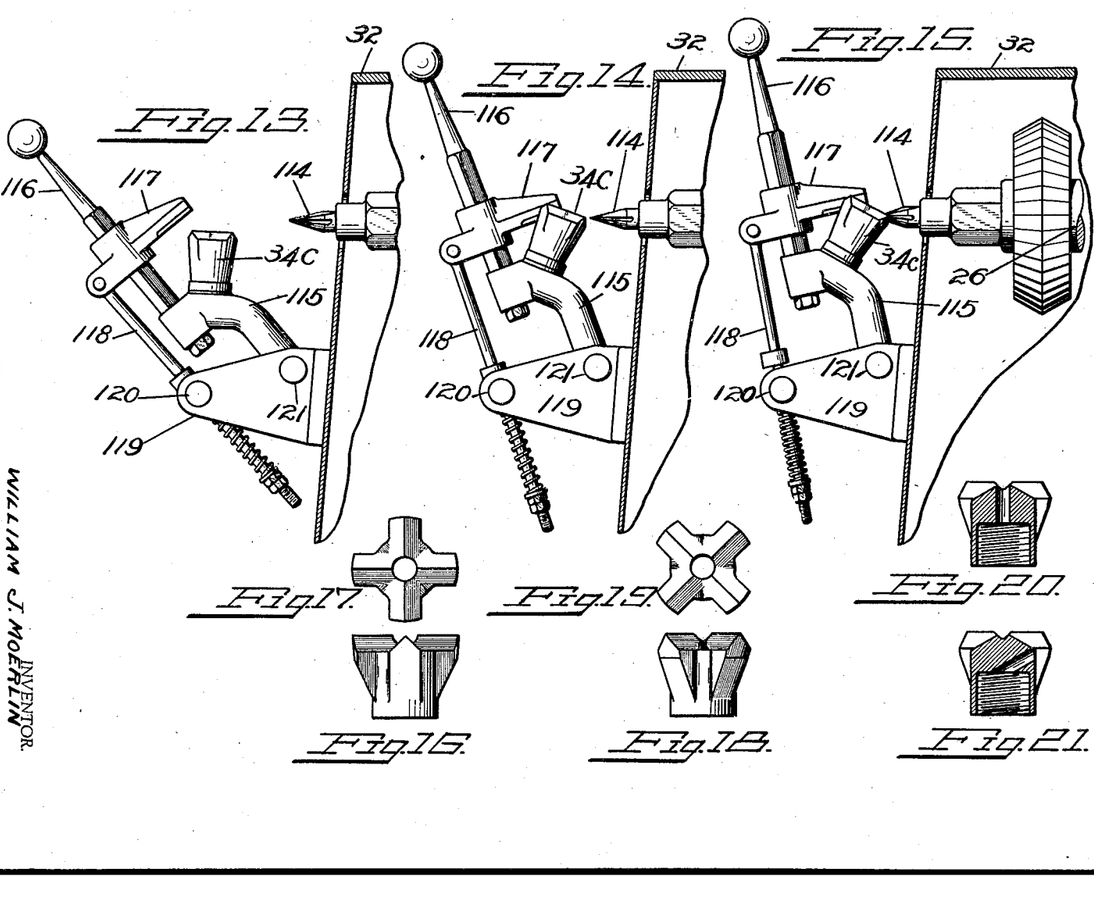
Figures 13, 14 and 15 are fragmentary views, partially in section, of a modified form of a component shown in Figure 1, and drawn to a somewhat larger scale.
Figure 16 is an elevation of a typical detachable rock bit.
Figure 17 is a top plan view thereof.
Figure 18 is another elevation of the detachable rock bit shown in Figure 16, viewed at a different angle.
Figure 19 is a top plan view thereof.
Figure 20 is a vertical sectional view of the bits illustrated in Figures 16, 17, 18 and 19.
Figure 21 is a vertical sectional view of a detachable rock drill bit that is similar to the one illustrated in Figures 16 to 20 except that the water-hole is positioned differently.

When a detachable rock drill bit 34 is to be mounted upon mechanism 33, said mechanism is retracted as illustrated in Figure 6, by means of lever handle 37, in which position the bit holder 42 upon mechanism 33 is conveniently accessible to place said bit thereon by means of the hollow socketed shank of the bit, which is illustrated in Figures 20 and 21.

After so mounting the workpiece upon the bit holder, the lever handle 37 is moved arcuately toward the milling cutter 27, bringing the mechanism 33 to the position shown in Figure 5, in which position it is locked against any force that may be applied thereto from the milling cutter 27, by means of the cooperative relationship of the toggle-like components 35—36—38—39—40—41.

This positioning of the toggle-mounted mechanism 33 as illustrated in Figure 5, does not in itself present the drill bit 34 to the milling cutter 27. This presentation of the bit to the sharpening cutter is very effectively accomplished by operating valve lever handle 43 which is connected with valve stem 43a which controls valve 44, clearly illustrated in Figure 22.

Figure 22:
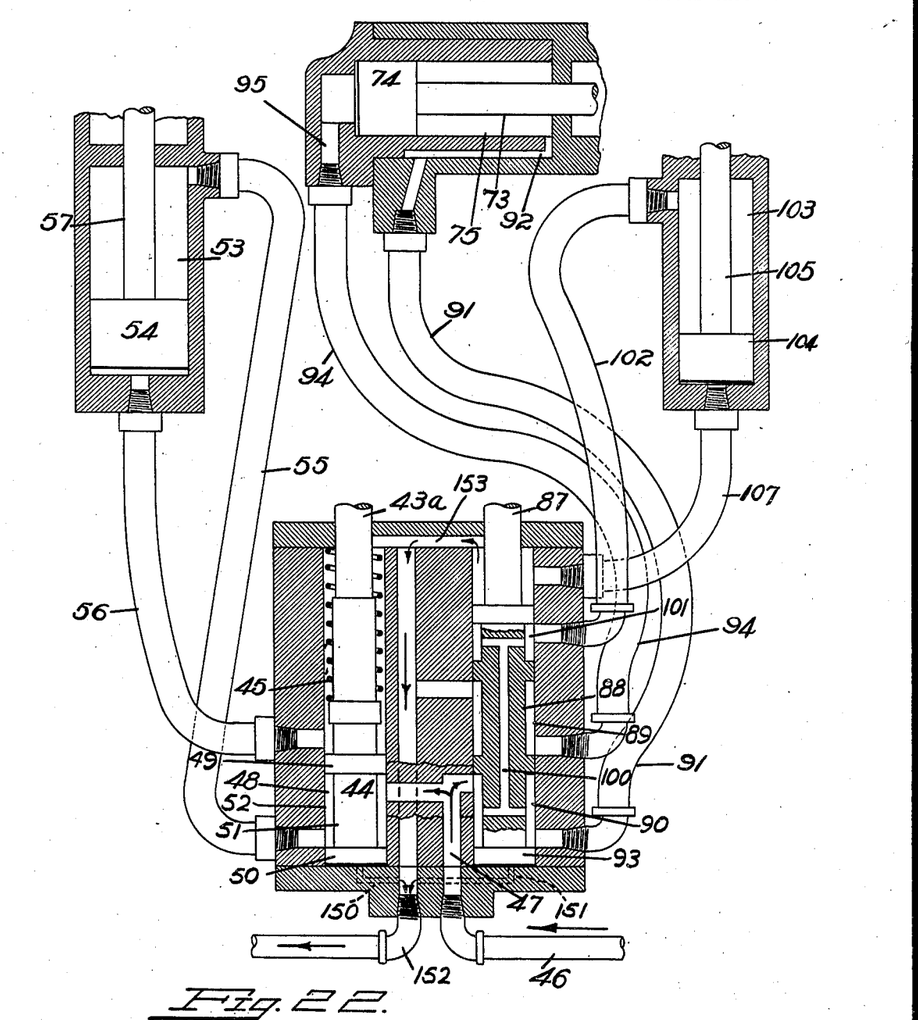
Figure 22 is a diagrammatic sectional illustration of certain pneumatic components of the machine illustrated in Figure 1, and drawn to a larger scale.

Prior to manual operation, valve 44 is securely held in its retracted position as illustrated in Figure 22, by the combined effects of compression spring 45 and pneumatic pressure, supplied from any convenient source not shown, through the intermediary of pipeline 46 and chamber 47 which connects with annular space 48 that is between pistons 49 and 50 which are component parts of the valve 44 and which are connected by stem 51 which is of less diameter than cylinder 52 in which pistons 49 and 50 are positioned to operate.

In this retracted position of valve 44, pneumatic pressure is applied in operating cylinder 53 which is a part of mechanism 33, above piston 54, through the intermediary of a flexible airline 55 which is in conductive communication with said cylinder 53 and with said annular space 48.

Upon raising valve 44, the connection of airline 55 with cylinder 52 is closed by piston 50, and the annular space 48 is raised with the valve to provide an air conductive connection between incoming air chamber 47 and a flexible airline 56 that connects with cylinder 53 below piston 54, thus to force piston 54 upwardly in its cylinder. As piston 50 rises, exhaust gas in airline 55 passes into a passage 150 and thence into exhaust line 152. This passage 150 is angularly disposed with reference to the plane of the section represented in Figure 22, for which reason it is shown only in dotted lines.

Piston 54 is connected with piston rod 57, which in turn is connected with bit holder 42 hereinbefore referred to. Said bit holder 42 is slidably and rotatably mounted within the mechanism 33, so that upon movement of the piston 54 upwardly in its cylinder 53, the rock drill bit 34 comes in contact with sharpening cutter 27.

Since the angular position of the mechanism 33 is securely held and locked by its toggle-like mounting, and since the air pressure below piston 54 holds the workpiece or drill bit 34 in contact with the milling cutter 27, no physical effort is required on the part of the operator to maintain these relationships.

In order to limit the longitudinal or axial movement of the bit holder 42 toward the milling cutter 27, a stop 58 is provided adjacent the milling cutter 27, against which the cutting edges of the bit 34 that are not in contact with the cutter 27 bear. This stop is contoured to conform with the bit surfaces which it engages, and thus serves to properly align the bit for the cutting operation as the bit is moved into register with the stop. The position of the stop 58 is subject to accurate adjustment by means of mechanism 59, so that uniform and optimum sharpening of each cutting edge on each bit is attained and uniformity between a plurality of bits is assured.

It is manifest that link 35 is pivotally connected with mechanism 33 and also pivotally connected with the base structure. Link 35 is pivotally connected with the base structure through the intermediary of eccentric 60 which is subject to optional positioning, and then locking by means of nut 61 whereby the angular operating position of mechanism 33 is subject to some variation to control the exact angle at which the bit 34 is presented to the sharpening cutter 27.

Most detachable rock drill bits are provided with four radial cutting edges positioned at 90° apart. Some may have more or less edges, but four are more common. It is therefore necessary to present the bit to the sharpening cutter 27 in four positions 90° apart. In order to accomplish these 90° rotations of the bit quickly and accurately, an indexing device is provided within the mechanism 33. This indexing device is well illustrated in Figure 2 and is diagrammatically shown in Figures 7, 8, 9, 10, 11 and 12.

On the lower or inner end of the rotary bit holder 42 is a clutch-like device having four helically-cut jaws 62 and having four lugs 63 that project radially on 90° centers. Mounted below and in axial alinement with the bit holder 42 is a sleeve 64 which is provided at its end nearest the bit holder 42 with four notches 65 each of which has an edge that is parallel to the line of axial movement of the bit holder, and another edge that is positioned at an angle thereto.

Carried within the sleeve 64 is a second and complementary clutch 66 having four helical jaws 67 that are positioned to engage helical jaws 62 on the tool holder.

The clutch 66 is rotatable within certain limits, with reference to the sleeve 64, its relative rotary movement being limited by lugs 68, which project radially therefrom and engage in notches 69 in said sleeve 64. The sequence of operating steps in the indexing action has been illustrated in Figures 7 through 12.

The clutch 66 is urged by coil spring 70 to the position shown in Figures 7, 9, 10, 11 and 12, with reference to the sleeve 64. It will be manifest from the drawings that helical jaws 62 and helical jaws 67 are somewhat undercut so that as the bit holder inclusive of helical jaws 62, is moved away from clutch 66, after complete engagement of the two sets of jaws 62 and 67, clutch 66 will be caused to rotate slightly against the tension of spring 70, as well illustrated in Figure 8. By so undercutting and moving jaws 67 point-to-point contact between jaws 62 and 67 in the next engaging action is avoided.

The operation of this indexing device is as follows. The operator moves air valve control lever 43 to move piston 54 and bit holder 42 carrying the workpiece 34, whereby said workpiece or drill bit 34 is presented to the sharpening cutter 27 and also bears against stop 58.

Figure 10:
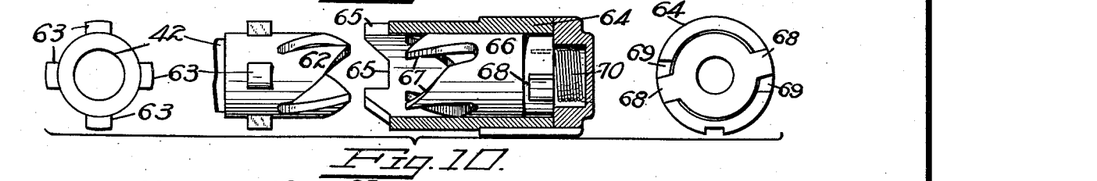
Figure 11:
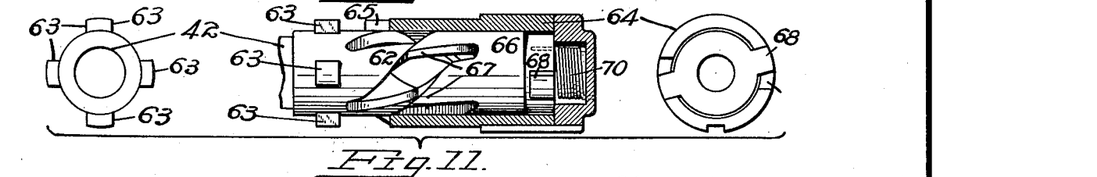
Figure 12:
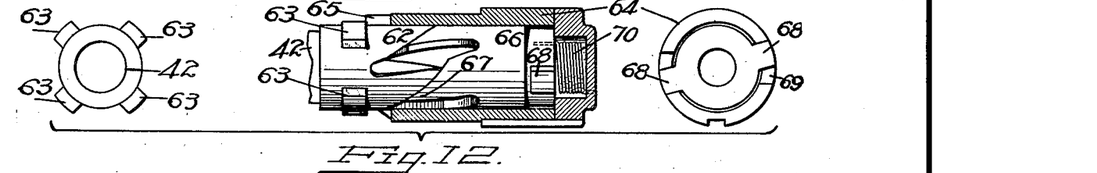

After this cut is finished, the bit holder 42 is retracted by reverse movement of the valve control lever 43, which brings jaws 62 into engagement with jaws 67, as illustrated in Figures 10, 11 and 12. This engagement rotates the bit holder 90° and at the same time, lugs 63 engage notches 65 in the relatively stationary sleeve 64 to stabilize and limit the rotary movement imparted to the bit holder; in other words, to prevent an "overrun" of the rotation of the bit holder.

Next, the operator actuates the pneumatic control valve 44 to present the workpiece 34 again to the sharpening cutter 27, in its new position.

As hereinbefore pointed out, when jaws 62 leave jaws 67, said jaws 67 rotate slightly against the tension of spring 70 due to the undercut relationship of the engaging jaws. Immediately after jaws 62 leave jaws 67, the clutch 66 is urged back to its normal position as illustrated in Figures 9, 10, 11 and 12, so that it will again receive jaws 62 during the next indexing cycle.

The tension of spring 70 is substantially balanced to the weight of sleeve 66 and after the lugs 63 are moved away from slots 65 (Figure 10) the clutch 66 returns to its initial position under the action of spring 70. In the retraction of the bit holder, sleeve 66 is held against rotation in one direction by the action of lugs 68 and the reengagement of coacting jaws 62, 67 provides an effective torque causing the bit holder to index.

If it were not for this particular spring-urged rotary movement of clutch 66 and its jaws 67, then jaws 62 would not properly engage jaws 67, because upon return of jaws 62 to jaws 67, they would tend to go back into the same engagement from which they were just separated, thus defeating the indexing advance of the whole device.

It is manifest that the mechanism designated as a whole by reference character 33, is so designed and constructed that the detachable rock drill bits readily may be placed thereon and efficiently and uniformly sharpened by the milling cutter 27, rapidly and with a minimum of effort. If the various operations herein outlined are done by manual labor, the job is unreasonably difficult, uncertain and tiresome.

The sharpening of the detachable rock drill bit, as hereinbefore explained, is but one stage in reconditioning the bit. After it has been sharpened, the bit is removed from sharpening holder 42 and placed upon a gauging holder 71, Figure 3, which is rotatably mounted in a carrier 72 which is connected with a piston rod 73 to which is attached an actuating piston 74 that is slidable in a pneumatic cylinder 75.

Figure 3:
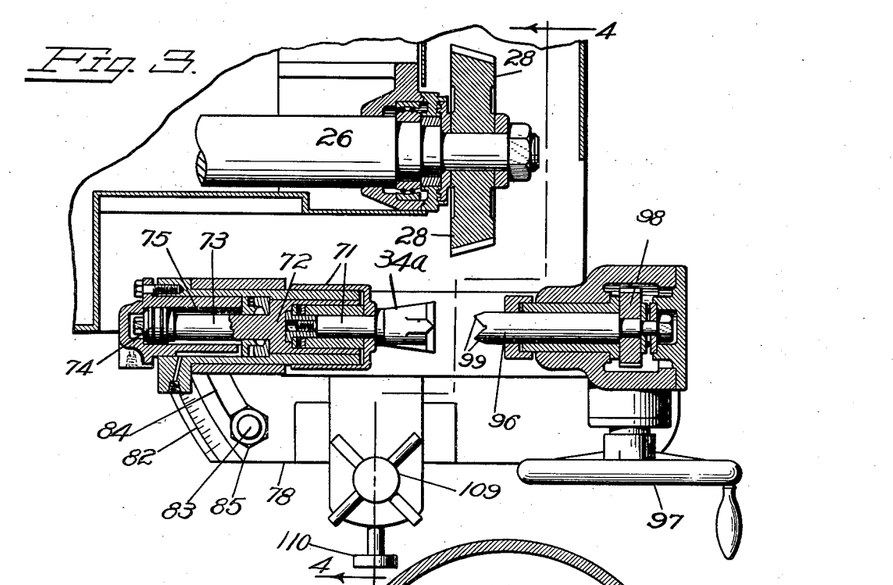
Figure 3 is a fragmentary sectional view taken along the line 3—3 of Figure 1, and drawn to a larger scale.
Figure 4:
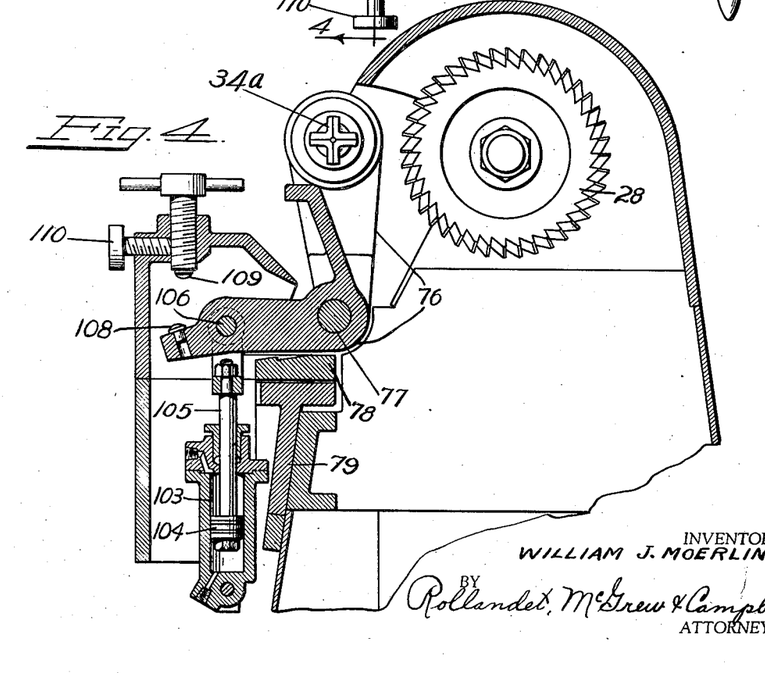
Figure 4 is a fragmentary sectional view taken along the line 4—4 of Figure 3.

This entire assembly 71—72—73—74—75 is mounted upon a carrier 76, Figure 4, that is pivoted at 77 to a plate 78, Figures 1 and 3, which is mounted upon a carriage 79 that is slidable upon the main base structure 25, by means of a hand-wheel 80 on screw 81, Figure 1.

The exact angular position of the plate 78 with reference to the main base structure, may be judged by an arcuate scale 82, and this angular relationship may be selectively fixed by means of a screw 83 affixed to the carriage 79, and positioned through an arcuate slot 84 in plate 78. A nut 85 on the screw 83 completes this locking combination.

Again referring to Figures 1 and 22, the operating features of the pneumatic piston and cylinder assembly 74—75 readily may be understood. An operating lever handle 86 is connected with pneumatic valve stem 87, which in turn is connected with control valve 88 in a cylinder 89.

When the valve is in its inactive position, as illustrated in Figure 22, air under pressure in chamber 47 is in conductive communication with annular chamber 90, with which is connected a flexible air conduit 91 which is in conductive communication with port 92 in cylinder 75, thus holding piston 74 in its retracted position within said cylinder 75.

As the operator elevates valve 88, piston 93 thereof shuts off the air supply connection of conduit 91, and annular chamber 90 is elevated to establish a conductive communication with flexible conduit 94 which leads to port 95 in cylinder 75, thus to force piston 74 and gauging bit holder 71, together with the bit 34a thereon, to the right, as illustrated in Figures 1 and 3.

This movement of holder 71 causes the bit 34a to engage a rotary dolly 96, which is also mounted on carrier 76 which is adapted for manual rotation by means of a hand-wheel 97, through the intermediary of suitable gears 98.

Thus when the workpiece or bit 34a is in engagement with the dolly 96, an operator may rotate said bit selectively by turning hand-wheel 97, since the dolly 96 is provided with means 99 for engaging the cutting faces of the bit.

When the valve 88 is in its retracted position, as illustrated in Figure 22, pneumatic pressure is conducted from annular space 90 through interior passage 100 within said valve, to annular space 101 with which flexible air conduit 102 is in conductive communication. The other end of conduit 102 is in communication with the interior of a cylinder 103, Figures 1, 4 and 22, above piston 104 therein, whereby said piston and its piston rod 105 are urged downwardly. Piston rod 105 is connected at 106 with pivotal carrier 76, so that in the retracted or lower position of said piston 104, the pivotal carriage 76 and therefore the gauge holder 71 and the bit 34a thereon, are pulled away from gauging cutter 28.

As the valve 88 is farther elevated, annular space 101 is brought into conductive communication with flexible air conduit 107 which is connected with said cylinder 103 below piston 104, thus to force piston 104 upwardly in its cylinder to move carrier 76 pivotally toward gauging cutter 28, thus to bring bit 34a to gauging contact with cutter 28 as the bit is rotated by means of hand-wheel 97.

This inward angular movement of the carrier 76 and the bit 34a thereon is limited by button 108 on said carrier contacting the lower rounded end of hand-screw 109, which may be selectively positioned accurately to control the amount of material to be cut from the bit. Thus hand-screw 109 gives the operator accurate control of the gauge, i. e., the diameter to which the bit is cut by cutter 28.

A locking screw 110 holds gauge-control hand-screw 109 in its predetermined position, thus to assure accurate uniform gauging of the bits, which, as hereinbefore pointed out, is of high importance and most difficult, uncertain and laborious to attain by less efficient means.

Since most detachable rock drill bits taper inwardly from their maximum cutting diameters toward their shanks for purposes of clearance, the face of the gauging cutter 28 is made at an angle with reference to its axis of rotation. However, it is desirable to vary the angle of the gauging cut of the drill bit from time to time depending upon the type of bit, the work to be done and other factors, so that it is of importance to provide the means whereby the axis of rotation of the bit 34a on the holder may be varied with reference to the axis of rotation of the shaft 26 upon which the milling cutters are mounted. Such provision is made by providing that the plate 78 is angularly movable with reference to the base structure 25 and may be locked in selective angular positions by means of screw 83 and its nut 85, Figure 3.

Furthermore, the entire assembly for holding and rotating the bit during gauging is axially movable with reference to shaft 26, by means of hand-wheel and screw 80—81, Figure 1, thus to give the operator additional control over the position at which the bit 34a is presented to the gauging cutter 28.

This axial relative movement is of high importance because, under some circumstances, the gauging cut on a bit should extend clear to its back end or shank, but under other circumstances, the angular gauging cut should not extend to the extreme back end of the shank.

After the gauging cut has been taken from the workpiece 34a, lowering of the control valve 88 by the operator through the intermediary of valve handle 86, first retracts piston 104 and thus angularly moves the carrier 76 and the bit 34a thereon, away from gauging cutter 28, to the position illustrated in Figure 4. Continued lowering of the valve 88 next retracts piston 74 in cylinder 75, to move the workpiece 34a to the left, as viewed in Figures 1, 3 and 22, to disengage the bit 34a from the dolly 96.

Gauging of the bit having now been accomplished, it may easily be removed from the holder 71 by means of suitable tongs, and it is now ready for reaming.

The next consideration is to ream the water-hole of the bit to remove any burrs or fins that may have been dragged thereover during its sharpening.

Referring to Figure 1, a lever handle 112 is pivoted to the end of the main base structure and is provided with a reaming bit holder 113 upon which the bit 34b may be placed for engagement with a reamer 114 which is in rotary driven connection with the shaft 26. It is manifest that the operator may advance the bit 34b toward the reamer 114 by means of the lever handle 112, thus to ream a central water-hole in the bit.

Arm 220 is pivoted at 221 to the main supporting structure of the machine and is urged outwardly therefrom by a spring member 122. This arm carries a head 123 that surrounds the reamer 114 and which is provided with notch-like recesses to engage the cutting edges on the bit 34b. When the bit 34b is presented to the reamer, the head 123 prevents said bit from rotating, and when the reaming has been completed, the spring-urged arm 220 pushes the bit away from the reamer. These functions are of importance since the bit 34b is loosely held upon the reaming bit holder 113.

Next referring to Figures 13, 14 and 15, a modified bit holder 115 is provided for pivotal movement by means of a lever handle 116. A stabilizer 117 is slidably carried upon the lever handle 116 and is connected with a spring-urged rod 118 which is pivoted to a bracket 119. The pivotal connection 120 of the spring-urged rod 118 is spaced away from the pivotal connection 121 of the bit holder 115, so that when the lever handle 116 is angularly moved toward the reamer 114, the stabilizer or clamp 117 will be drawn down into contact with the bit 34c which has the angular or side water-hole as illustrated in Figure 21. By this arrangement, the bit 34c is securely held while the reamer 114 enters the water-hole and removes any fins or burrs therefrom.

Next referring to Figures 23 and 24, it will be seen that gauging cutter 28, which is illustrated as being in cutting relationship with the bit or workpiece 34a, tends to cut a notch in said bit as at 130. If the bit or workpiece 34a is moved axially across the cutting surfaces of the cutter 28, then the notch 130 would be cut away and would disappear. Provision for so moving the workpiece across the cutter 28 has been hereinbefore described, and includes carriage 79 and wheel 80 and screw 81, Figure 1. However, under some circumstances, a complete gauging cut across the entire length of the bit 34a may be undesirable because it may remove too much metal from the relatively narrow shank end thereof. A notch such as 130 would be undesirable to leave in the periphery of the bit.

To eliminate the production of a notch 130 and at the same time to remove the absolute necessity of passing the bit 34a entirely across the cutting edges of the gauging cutter 28, a specially shaped gauging cutter 28a, Figure 24, has been created. It is manifest that the modified gauging cutter 28a does not leave a notch in the bit 34a, even though said bit may not be passed entirely across the cutting edges.

Finally referring to Figure 25, which illustrates certain portions of the indexing device of mechanism 33, it will be seen that a special bushing 131 may be provided with slots 132 that are positioned to be engaged by lugs 63 on bit holder 42 as jaws 62 leave jaws 67, for the purpose of contributing an additional factor of guidance to the bit holder 42, so that said bit holder will be held in its proper indexing relationship to the sharpening cutter 27, and will not be inadvertently over-rotated by the indexing action hereinbefore set forth.

Thus is provided a machine with semi-automatic features that is a distinct and much wanted advance in the art. By means of this machine, the quality of the work is sharply improved and the exact sequence of events is coordinated for efficiency and ease of operation.

All of the necessary steps in reconditioning a worn detachable rock drill bit or the like, are accomplished in a standardized manner and with a minimum of effort on the part of the operator.

What I claim and desire to secure by Letters Patent is:

1. In a machine for hot milling detachable rock drill bits or the like, inclusive of a base structure and a rotary sharpening cutter journalled for rotation thereon, the improvement which comprises a toggle-mounted mechanism on the base structure for presenting a bit to said sharpening cutter and comprising a rotatable and axially movable bit holder, means for angularly moving said mechanism on its toggle mounting, means for axially reciprocating said bit holder, helically cut jaws on the bit holder, a clutch having another set of similar helical jaws in axial alinement with said bit holder and positioned to engage the first said helical jaws when the bit holder is axially moved for indexing the bit holder, the clutch being rotatable within certain limits, and resilient means for urging the clutch in one direction of rotation.

2. In a machine for hot milling detachable rock drill bits or the like, inclusive of a base structure and a rotary sharpening cutter journalled for rotation thereon, the improvement which comprises a toggle-mounted mechanism on the base structure for presenting a bit to said sharpening cutter and comprising a rotatable and axially movable bit holder, means for angularly moving said mechanism on its toggle mounting, means for axially reciprocating said bit holder, helically cut jaws on the bit holder, a clutch having another set of similar helical jaws in axial alinement with said bit holder and positioned to engage the first said helical jaws when the bit holder is axially moved for indexing the bit holder, the clutch being rotatable within certain limits, resilient means for urging the clutch in one direction of rotation, and means associated with the bit holder for axially guiding it and for preventing over-rotation thereof.

3. In a machine for hot milling detachable rock drill bits or the like, inclusive of a base structure and a rotary sharpening cutter journalled for rotation thereon, the improvement which comprises a toggle-mounted mechanism on the base structure for presenting a bit to said sharpening cutter and comprising a rotatable and axially movable bit holder, means for angularly moving said mechanism on its toggle mounting, means for axially reciprocating said bit holder, helically cut jaws on the bit holder, a clutch having another set of similar helical jaws in axial alinement with said bit holder and positioned to engage the first said helical jaws when the bit holder is axially moved for indexing the bit holder, the clutch being rotatable within certain limits, resilient means for urging the clutch in one direction of rotation, means associated with the bit holder for axially guiding it and for preventing over-rotation thereof, and a stop element positioned adjacent said sharpening cutter for engagement with a bit on the bit holder whereby axial movement thereof toward said cutter is limited.

4. In a machine for milling rock drill bits or the like inclusive of a base structure and a rotary sharpening cutter journalled thereon, the improvement which comprises a mechanism on the base structure for presenting a bit to said sharpening cutter and comprising a rotatable and axially movable bit holder, means for axially reciprocating said bit holder, complementary clutch members on said bit holder and on said mechanism and in axial alinement, each of said clutch members comprising helically cut jaws, the clutch member on said mechanism being movable within certain limits, and resilient means for moving said last mentioned members in one direction of rotation whereby said bit holder is indexed upon each axial movement thereof.

5. In a machine for milling rock drill bits or the like inclusive of a base structure and a rotary sharpening cutter journalled thereon, the improvement which comprises a mechanism on the base structure for presenting a bit to said sharpening cutter and comprising a rotatable and axially movable bit holder, means for axially reciprocating said bit holder, complementary clutch members on said bit holder and on said mechanism and in axial alinement, said clutch members each comprising jaws axially undercut on one side and helically sloping on the other, the clutch member on said mechanism being movable within certain limits, and resilient means for moving said last mentioned member in one direction of rotation whereby said undercut sides of said jaws move said member on said mechanism against said resilient means upon axial withdrawing movement of said bit holder and index said bit holder upon reengagement of said clutch.

6. In a machine for milling rock drill bits or the like inclusive of a base structure and a rotary sharpening cutter journalled thereon, the improvement which comprises a mechanism on the base structure for presenting a bit to said sharpening cutter and comprising a rotatable and axially movable bit holder, means for axially reciprocating said bit holder, complementary clutch members on said bit holder and on said mechanism and in axial alinement, each of said clutch members comprising helically cut jaws, the clutch member on said mechanism being movable within certain limits, and resilient means for moving said last mentioned member in one direction of rotation whereby said bit holder is indexed upon each axial movement thereof, and additional interengaging members on said bit holder and on said mechanism for axially guiding said bit holder and for preventing over-rotation of said bit holder.

7. In a machine for milling multiple edged drill bits or the like, inclusive of a base structure and a rotary sharpening cutter journalled for rotation thereon, the improvement which comprises a pivotally mounted mechanism on the base structure for presenting a bit to said sharpening cutter and comprising a rotatable and axially movable bit holder, means for angularly moving said mechanism on its pivotal mounting, means for axially reciprocating said bit holder, angularly cut jaws on the bit holder, a clutch having a complementary set of angularly cut jaws in axial alinement with said bit holder and positioned to engage the first said jaws upon axial movement of the bit holder, the clutch being rotatable within certain limits, and resilient means for urging the clutch in one direction of rotation.

8. In a machine for milling rock drill bits or the like, inclusive of a base structure and a rotary sharpening cutter journalled thereon, the improvement which comprises a toggle mounted mechanism on the base structure for presenting a bit to said sharpening cutter and comprising a rotatable and axially movable bit holder, means for angularly moving said mechanism on its toggle mounting, means for axially reciprocating said bit holder, and complementary clutch members on said bit holder and on said mechanism for rotating said bit holder to a different sharpening position upon each reciprocating movement thereof.

9. In a machine for milling rock drill bits or the like, inclusive of a base structure and a rotary sharpening cutter journalled thereon, the improvement which comprises a toggle mounted mechanism on the base structure for presenting a bit to said sharpening cutter and comprising a rotatable and axially movable bit holder, means for angularly moving said mechanism on its toggle mounting, means for axially reciprocating said bit holder, complementary clutch members on said bit holder and on said mechanism for rotating said bit holder to a different sharpening position upon each reciprocating movement thereof, and a stop member adjacent said cutter for limiting axial movement of said bit holder and for determining the position of the bit with respect to the cutter.

WILLIAM J. MOERLIN.